(12) United States Patent
Hong et al.

(10) Patent No.: US 10,513,270 B2
(45) Date of Patent: Dec. 24, 2019

(54) DETERMINING VEHICLE DRIVING BEHAVIOR

(71) Applicant: Ford Global Technologies, LLC, Dearborn, MI (US)

(72) Inventors: Sanghyun Hong, Ann Arbor, MI (US); Jianbo Lu, Northville, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/971,375

(22) Filed: May 4, 2018

(65) Prior Publication Data

US 2019/0337522 A1    Nov. 7, 2019

(51) Int. Cl.
*B60W 40/09* (2012.01)
*G06N 7/00* (2006.01)
*B60W 50/00* (2006.01)

(52) U.S. Cl.
CPC .............. *B60W 40/09* (2013.01); *G06N 7/005* (2013.01); *B60W 2050/0029* (2013.01); *B60W 2520/10* (2013.01); *B60W 2520/14* (2013.01); *B60W 2540/18* (2013.01); *B60W 2540/30* (2013.01)

(58) Field of Classification Search
CPC ......... B60W 40/09; B60W 2050/0029; B60W 2520/10; B60W 2520/14; B60W 2540/18; B60W 2540/30; G06N 7/005
See application file for complete search history.

(56) References Cited

U.S. PATENT DOCUMENTS

| | | | |
|---|---|---|---|
| 9,111,400 B2 | 8/2015 | Bando et al. | |
| 9,650,051 B2 | 5/2017 | Hoye et al. | |
| 2009/0115589 A1* | 5/2009 | Galley | A61B 5/18 340/439 |
| 2011/0187520 A1* | 8/2011 | Filev | B60W 50/16 340/438 |

(Continued)

FOREIGN PATENT DOCUMENTS

| | | |
|---|---|---|
| CN | 106023344 A | 10/2016 |
| CN | 106534366 A | 3/2017 |

(Continued)

OTHER PUBLICATIONS

Hong, et. al., "Transition Probability Estimation and its Application in Evaluation of Automated Driving", 2017 IEEE International Conference on Systems, Man, and Cybernetics (SMC), Banff Center, Banff, Canada, Oct. 5-8, 2017, pp. 3385-3390 (6 pages).

(Continued)

*Primary Examiner* — Sisay Yacob
(74) *Attorney, Agent, or Firm* — Frank A. MacKenzie; Bejin Bieneman PLC

(57) ABSTRACT

A system may include a plurality of vehicle sensor and a computer comprising a processor and memory storing instructions executable by the processor. One of the instruction may comprise to determine a driving responsiveness (DR) value using a weighted sum comprising indices of a transition probability matrix (Q), Q being derived from likelihood of transition data (Λ) between a plurality of driving modes from a set of interacting multiple model (IMM) instruction.

20 Claims, 8 Drawing Sheets

(56) References Cited

U.S. PATENT DOCUMENTS

| | | | | |
|---|---|---|---|---|
| 2011/0307188 A1* | 12/2011 | Peng | ............... | G06Q 10/0639 |
| | | | | 702/33 |
| 2011/0320163 A1* | 12/2011 | Markkula | ........... | B60W 40/072 |
| | | | | 702/150 |
| 2013/0054049 A1* | 2/2013 | Uno | .................. | B60W 40/08 |
| | | | | 701/1 |
| 2016/0288798 A1* | 10/2016 | Michalke | .............. | B60W 40/09 |
| 2018/0286220 A1* | 10/2018 | Fowe | ............... | B60W 30/0953 |

FOREIGN PATENT DOCUMENTS

| | | | | |
|---|---|---|---|---|
| JP | 4069481 B2 | 4/2008 | | |
| JP | 2009157606 A | 7/2009 | | |
| WO | 2015144410 A1 | 10/2015 | | |
| WO | WO 2015144410 | * 10/2015 | ............ | B60W 50/00 |

OTHER PUBLICATIONS

Hong, et. al., "An Interacting Multiple Model-based Algorithm for Driver Behavior Characterization Using Handling Risk", IEEE Transactions on Intelligent Transportation Systems ( Early Access ), sponsored by IEEE Intelligent Transportation Systems Society, published Dec. 21, 2016 (10 pages).

* cited by examiner

FIG. 5

|     |     |     |
| --- | --- | --- |
| $q_{1,1}$ | $q_{1,2}$ | $q_{1,3}$ |
| $q_{2,1}$ | $q_{2,2}$ | $q_{2,3}$ |
| $q_{3,1}$ | $q_{3,2}$ | $q_{3,3}$ |

DETERMINING VEHICLE DRIVING BEHAVIOR

BACKGROUND

It can be difficult to determine a need for maintenance for vehicles operating in an autonomous driving mode. Tire wear, tire leaks, wheel misalignment, etc. can affect the response of the vehicle driving in an autonomous mode but also be difficult for an autonomous driving computer to detect.

BRIEF DESCRIPTION OF THE DRAWINGS

FIG. 5 illustrates an example of a transition probability matrix (Q) determined using the TPE instructions.

DETAILED DESCRIPTION

Figure 1:
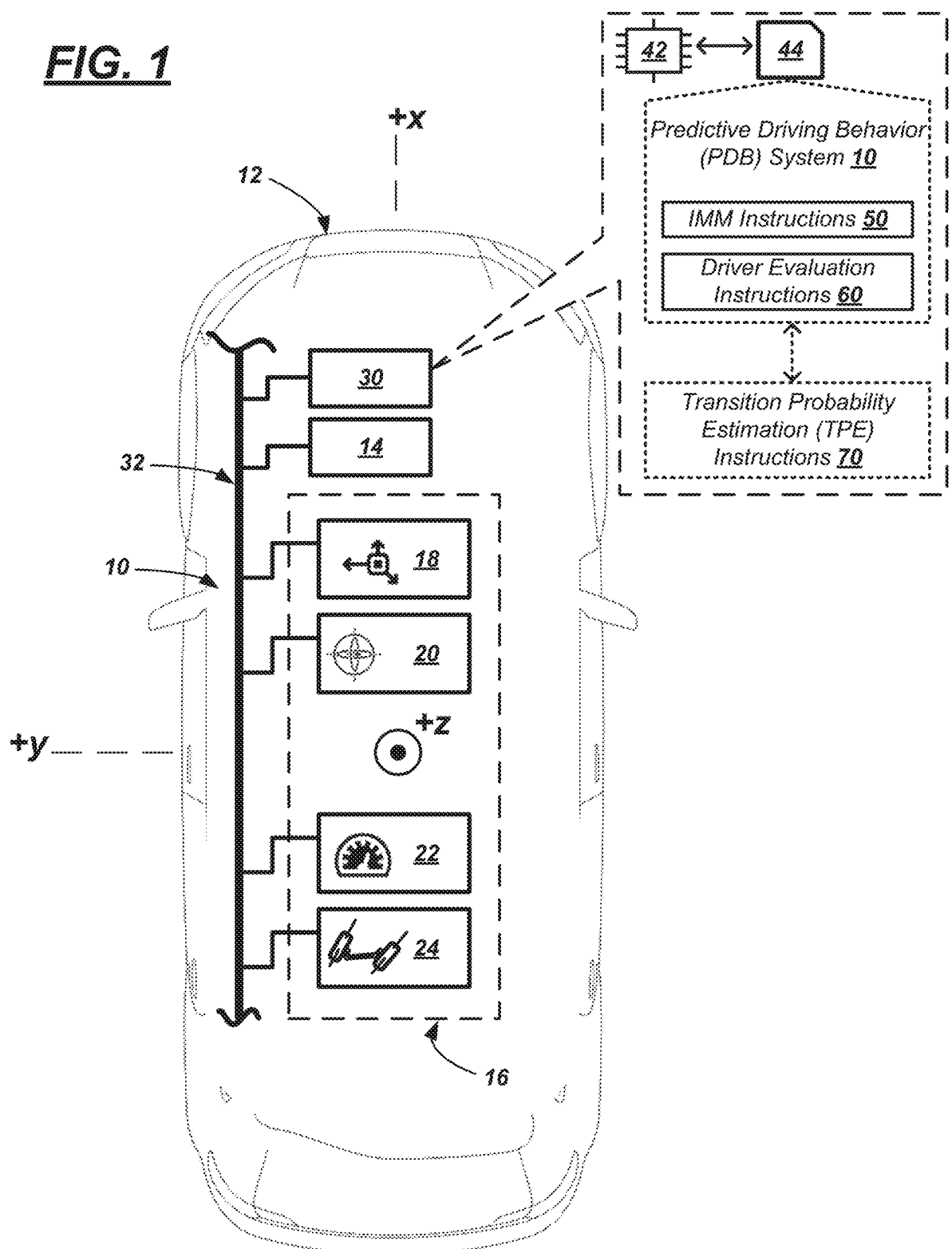
FIG. 1 is a schematic diagram illustrating a vehicle comprising an example of a predictive driving behavior (PDB) system.

A predictive driving behavior (PDB) system is described that can include a plurality of vehicle sensors and a computer. According to one illustrative example, a method of using the system, comprises: determining a driving responsiveness (DR) value using a weighted sum comprising indices of a transition probability matrix (Q), the Q being derived from likelihood of transition data ($\Lambda$) between a plurality of driving modes from a set of interacting multiple model (IMM) instructions.

According to the at least one example set forth above, the Q is based on a set of transition probability estimation instructions that include a Hidden Markov Model algorithm.

According to the at least one example set forth above, the plurality of driving modes comprises a low-aggressiveness mode, a medium-aggressiveness mode, and a high-aggressiveness mode.

According to the at least one example set forth above, the DR value represents a probability of transitioning from a higher aggressiveness mode to a lesser aggressiveness driving mode.

According to the at least one example set forth above, the DR value equals $w_{21}q_{21}+w_{31}q_{31}+w_{32}q_{32}$, wherein $w_{21}$, $w_{31}$, and $w_{32}$ are predefined weighting values, wherein $q_{21}$, $q_{31}$, and $q_{32}$ are index values of the Q (according to $q_{ij}$) for indices that satisfy i>j.

According to the at least one example set forth above, the DR value equals $w_{31}q_{31}+w_{32}q_{32}+w_{33}q_{33}$, wherein $w_{31}$, $w_{32}$, and $w_{33}$ are predefined weighting values, wherein $q_{31}$, $q_{32}$, and $q_{33}$ are index values of the Q.

According to the at least one example set forth above, the DR value represents a probability of transitioning from a lesser aggressiveness mode to a higher aggressiveness driving mode.

According to the at least one example set forth above, the DR value equals $w_{11}q_{11}+w_{12}q_{12}+w_{13}q_{13}$, wherein $w_{11}$, $w_{12}$, and $w_{13}$ are predefined weighting values, wherein $q_{11}$, $q_{12}$, and $q_{13}$ are index values of the Q.

According to the at least one example set forth above, the DR value represents a probability of maintaining a medium aggressiveness mode.

According to the at least one example set forth above, the DR value equals $w_{21}q_{21}+w_{22}q_{22}+w_{23}q_{23}$, wherein $w_{21}$, $w_{22}$, and $w_{23}$ are predefined weighting values, wherein $q_{21}$, $q_{22}$, and $q_{23}$ are index values of the Q.

According to the at least one example set forth above, further comprising: determining a corresponding driving score (DS) using the Q.

According to the at least one example set forth above, further comprising: determining an eigenvector (p*) of Q having an eigenvalue of 1.

According to the at least one example set forth above, $DS=v_1p_1^*+v_2p_2^*+v_3p_3^*$, wherein $v_1$, $v_2$, and $v_3$ are predefined weighting values associated with a low-aggressiveness mode, a medium-aggressiveness mode, and a high-aggressiveness mode, respectively.

According to another illustrative example, a system is described. The system may comprise a plurality of sensors; and a computer, comprising a processor and memory storing instructions executable by the processor. The instruction may comprise, to: derive likelihood of transition data ($\Lambda$) between a plurality of driving modes from sensor data from the plurality of sensors; and using the likelihood of transition data ($\Lambda$), determine a driving responsiveness (DR) value using a weighted sum comprising indices of a transition probability matrix (Q).

According to the at least one example set forth above, the instructions further comprising, to: execute a set of driver evaluation instructions, a set of IMM instructions, and a set of transition probability estimation (TPE) instructions.

According to the at least one example set forth above, the DR value represents a probability of transitioning from a higher aggressiveness mode to a lesser aggressiveness driving mode.

According to the at least one example set forth above, the DR value equals one of: $w_{21}q_{21}+w_{31}q_{31}+w_{32}q_{32}$, wherein $w_{21}$, $w_{31}$, and $w_{32}$ are predefined weighting values, wherein $q_{21}$, $q_{31}$, and $q_{32}$ are index values of the Q (according to $q_{ij}$) for indices that satisfy i>j; or $w_{31}q_{31}+w_{32}q_{32}+w_{33}q_{33}$, wherein $w_{31}$, $w_{32}$, and $w_{33}$ are predefined weighting values, wherein $q_{31}$, $q_{32}$, and $q_{33}$ are index values of the Q.

According to the at least one example set forth above, the DR value represents a probability of transitioning from a lesser aggressiveness mode to a higher aggressiveness driving mode, wherein the DR value equals $w_{11}q_{11}+w_{12}q_{12}+w_{13}q_{13}$, wherein $w_{11}$, $w_{12}$, and $w_{13}$ are predefined weighting values, wherein $q_{11}$, $q_{12}$, and $q_{13}$ are index values of the Q.

According to the at least one example set forth above, the DR value represents a probability of maintaining a medium aggressiveness mode, wherein the DR value equals $w_{21}q_{21}+w_{22}q_{22}+w_{23}q_{23}$, wherein $w_{21}$, $w_{22}$, and $w_{23}$ are predefined weighting values, wherein $q_{21}$, $q_{22}$, and $q_{23}$ are index values of the Q.

According to the at least one example set forth above, the instructions further comprising, to: determine a corresponding driving score (DS) using the Q; and determine an eigenvector (p*) of Q having an eigenvalue of 1, wherein $DS = v_1 p_1^* + v_2 p_2^* + v_3 p_3^*$, wherein $v_1$, $v_2$, and $v_3$ are predefined weighting values associated with a low-aggressiveness mode, a medium-aggressiveness mode, and a high-aggressiveness mode, respectively.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

A predictive driving behavior system 10 for a vehicle 12 is described. The system 10 can receive vehicle sensor data as an input and provide as an output a driving responsiveness (DR) value and/or a driving score (DS). As used herein, a driving score (DS) classifies driving behavior into one of a plurality of driving modes. And a driving responsiveness (DR) value, as used herein, is a probability that a driver of vehicle 12 will change from one driving mode to another; the driver responsiveness value includes a magnitude and a direction (e.g., more aggressive or less aggressive). As used herein, a driving mode is a classification of driving aggressiveness. And as used herein, a driver comprises a human driver or a computer programmed to autonomously navigate the vehicle 12 without human intervention. For example, the description that follows illustrates an example using three driving modes: a low-aggressiveness (LOW-AGG) mode, a medium-aggressiveness (MED-AGG) mode, and a high-aggressiveness (HIGH_AGG) mode. These LOW-AGG, MED-AGG, and HIGH-AGG modes are an example of relative driving aggressiveness (described more below), and more or fewer such driving modes may be used in other examples. Thus, as explained more below, system 10 may receive sensor data as input (e.g., indicative of wheel speeds, accelerations and decelerations, turning radiuses and rates, and the like), update a transition probability matrix (Q) based on the input, and then use the Q to determine the driving score (DS) and/or one or more driving responsiveness (DR) values.

Identifying a driving score (DS) may promote better driving behavior—e.g., alerting a current driver of the vehicle to his/her less favorable driving habits or techniques. In some examples, driving score (DS) information may be used by insurance companies to tune insurance rates for an individual driver. In at least some examples, the driving score (DS) of a less-experienced driver may be reported to a parent or guardian (e.g., giving a driving report to an authorized person). Other uses exist as well.

Driving responsiveness (DR) values similarly may be used by a human driver—e.g., being an indicator of overall driving patterns and behavior. In at least one example, vehicle 12 is being operated in an autonomous mode, and the driving responsiveness (DR) values may be indicative of a need for vehicle maintenance. Non-limiting examples of needed vehicle maintenance that may be triggered by a driving responsiveness (DR) value include: excessive tire wear, air-pressure deficiency of a vehicle tire, wheel misalignment, and the like. It should be appreciated that an experienced human driver might identify a need for vehicle maintenance by feel (e.g., reduced stopping ability or skidding during turning (e.g., due to tire wear), decreased gas mileage and/or reduced vehicle steering control (e.g., due to tire(s) operating under recommended tire pressure), so-called pulling-to-the-left or pulling-to-the-right in vehicle steering (e.g., due to wheel misalignment), etc. However, for example, with respect to vehicles operating at least temporarily—in a fully autonomous mode (i.e., absent a human driver), vehicle 12 itself may detect a need for vehicle maintenance based on driving responsiveness (DR) values—e.g., an increase or decrease in driving aggressiveness by an onboard computer (e.g., a so-called virtual driver), wherein the onboard computer is attempting compensate for excessive tire wear, air-pressure deficiency of a vehicle tire, wheel misalignment, or the like by changing driving aggressiveness. Accordingly, while not limited to autonomous vehicle implementations, driving responsiveness (DR) values can promote timely vehicle maintenance and/or uniformity in autonomous vehicle driving.

A description of an example vehicle environment follows. Thereafter, examples of methods to utilize system 10 will be described.

FIG. 1 illustrates vehicle 12 which comprises the predictive driving behavior system 10. Vehicle 12 is shown as a passenger car; however, vehicle 12 could also be a truck, sports utility vehicle (SUV), recreational vehicle, bus, train car, aircraft, or the like that includes the system 10. According to one non-limiting example, vehicle 12 is an autonomous vehicle—i.e., it operates in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention. While not required, in at least one example, vehicle 12 includes one or more onboard computers 14 which facilitate operation in level 5 autonomous driving. Thus, the one or more onboard computers 14 may be a driver, as used herein.

FIG. 1 illustrates a non-limiting example of a Cartesian coordinate system is shown with respect to vehicle 12. In this example, an X-axis extends through a longitudinal length of the vehicle 12, a Y-axis extends transversely through the vehicle 12, and a Z-axis extends vertically through vehicle 12; in at least one example, an origin (not shown) may be located at a center-of-gravity (CG) of vehicle 12; however, this location is not required. As will be explained below, sensors of vehicle 12 may detect translations and/or rotations with respect to one or more of the axes.

According to at least one example, system 10 comprises vehicle sensors 16 (including e.g., one or more accelerometers 18, one or more gyroscopes 20, one or more wheel speed sensors 22, and/or a steering angle sensor 24) and a computer 30. The sensors 16 (e.g., individually or collectively), computer(s) 14, and computer 30 may be connected together via any suitable wired or wireless network connection 32 enabling communication between the electronic devices 14, 18, 20, 22, 24, 30 and any other electronic devices (not shown) onboard vehicle 12. In at least one example, the connection 32 includes one or more of a controller area network (CAN) bus, Ethernet, Local Interconnect Network (LIN), a fiber optic connection, or the like. Other examples also exist. For example, alternatively or in combination with e.g., a CAN bus, connection 32 could comprise one or more discrete wired or wireless connections.

The one or more accelerometers 18 may be any electro-mechanical devices which detect acceleration in at least one axis, and it may be desirable to detect acceleration in the X-, Y-, and Z-vehicle axes. Thus, three accelerometers 18 may be used; or a single tri-axis accelerometer 18 may be used instead. In at least one example, the axes of the tri-axis accelerometer are oriented parallel to the vehicle axes shown in FIG. 1. Accelerometers and techniques for using them to receive sensor data (e.g., at computer 30) will not be discussed in great detail as these devices and techniques are generally known in the art.

The one or more gyroscopes 20 may be any electro-mechanical devices which detect rotation in at least one axis, and it may be desirable to detect rotation about any of the X-, Y-, and Z-vehicle axes. Thus, three gyroscopes 20 may be used; or a single tri-axis gyroscope 20 may be used instead. In at least one example, the axes of the gyroscope 20 are oriented parallel to the vehicle axes shown in FIG. 1. Gyroscopes and techniques for using them to receive sensor data (e.g., at computer 30) will not be discussed in great detail as these devices and techniques are generally known in the art.

The one or more wheel speed sensors 22 may be any electro-mechanical (e.g., including electro-optical) or electrical device for detecting rotational speed of one or more of the wheels (not shown) of vehicle 12. Non-limiting examples of wheel speed sensors include: rotary speed sensors, encoders, bearing-less wheelset sensors, optical sensors, magnetic sensors, and the like. Wheel speed sensors and techniques for using them to receive sensor data (e.g., at computer 30) will not be discussed in great detail as these devices and techniques are generally known in the art.

The steering angle sensor 24 may be any electro-mechanical (e.g., including electro-optical) or electrical device for detecting rate of turn or steering angle of vehicle wheels (not shown) relative to a vehicle chassis. Sensor 24 may be implemented in mechanical steering systems, as well as so-called drive-by-wire systems. Non-limiting examples of steering angle sensors include: magnetic or Hall-effect sensors, optical encoders, and the like. Steering angle sensors and techniques for using them to receive sensor data (e.g., at computer 30) will not be discussed in great detail as these devices and techniques are generally known in the art.

Computer 30 comprises at least one processor 42 and memory 44 (e.g., a non-transitory, computer-readable storage medium). Processor 42 may be programmed to process and/or execute digital instructions to carry out at least some of the tasks described herein. Non-limiting examples of processor 42 include a microprocessor, a microcontroller or controller, an application specific integrated circuit (ASIC), a field-programmable gate array (FPGA), etc.—just to name a few. And a few non-limiting examples of digitally-stored instructions—storable in memory 44 and executable by processor 42—include, to: determine a driving responsiveness (DR) value using a weighted sum comprising indices of a transition probability matrix (Q), Q being derived from likelihood of transition data (Λ) between a plurality of driving modes from a set of interacting multiple model (IMM) instruction. Additional and more specific examples of instructions which may be used instead of and/or in addition to these examples, as well as sequences of instructions, are described in the one or more processes below. In at least one example, computer 30 executes a computer program product stored on a non-transitory computer-readable storage medium (e.g., of memory 44). As used herein, a computer program product means a set of instructions (e.g., also called code).

Memory 44 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 44 may store one or more computer program products which may be embodied as software, firmware, or other programming instructions executable by the processor 42.

FIG. 1 illustrates that memory 44 may store, among other things, a set of interacting multiple model (IMM) instructions 50, a set of driver evaluation (DE) instructions 60, and a set of transition probability estimation (TPE) instructions 70. Each of the instructions 50, 60, 70 may be a unique set of software instructions executable by the processor 42 which, when executed collectively, may receive input from vehicle sensors 16 and output one or more driving responsiveness (DR) values and/or a driving score (DS). Each set of instructions 50, 60, 70 will be described in turn below.

It should be appreciated that each of the instructions 50, 60, 70 may be stored and executed by computer 30; however, in other examples, one computer (e.g., such as computer 30) may store and execute one or two of the sets of instructions 50, 60, 70 while one or two other computers (not shown) could store and execute the others of the instructions 50, 60, 70—e.g., such computers communicating over the network connection 32 discussed above. In at least one example, all sets of instructions 50, 60, 70 are executable by one computer (e.g., computer 30)—thereby enabling computer 30 to more expeditiously output, e.g., a driving responsiveness (DR) value, which value may be time-sensitive (e.g., when operating in an autonomous driving mode).

Figure 2:
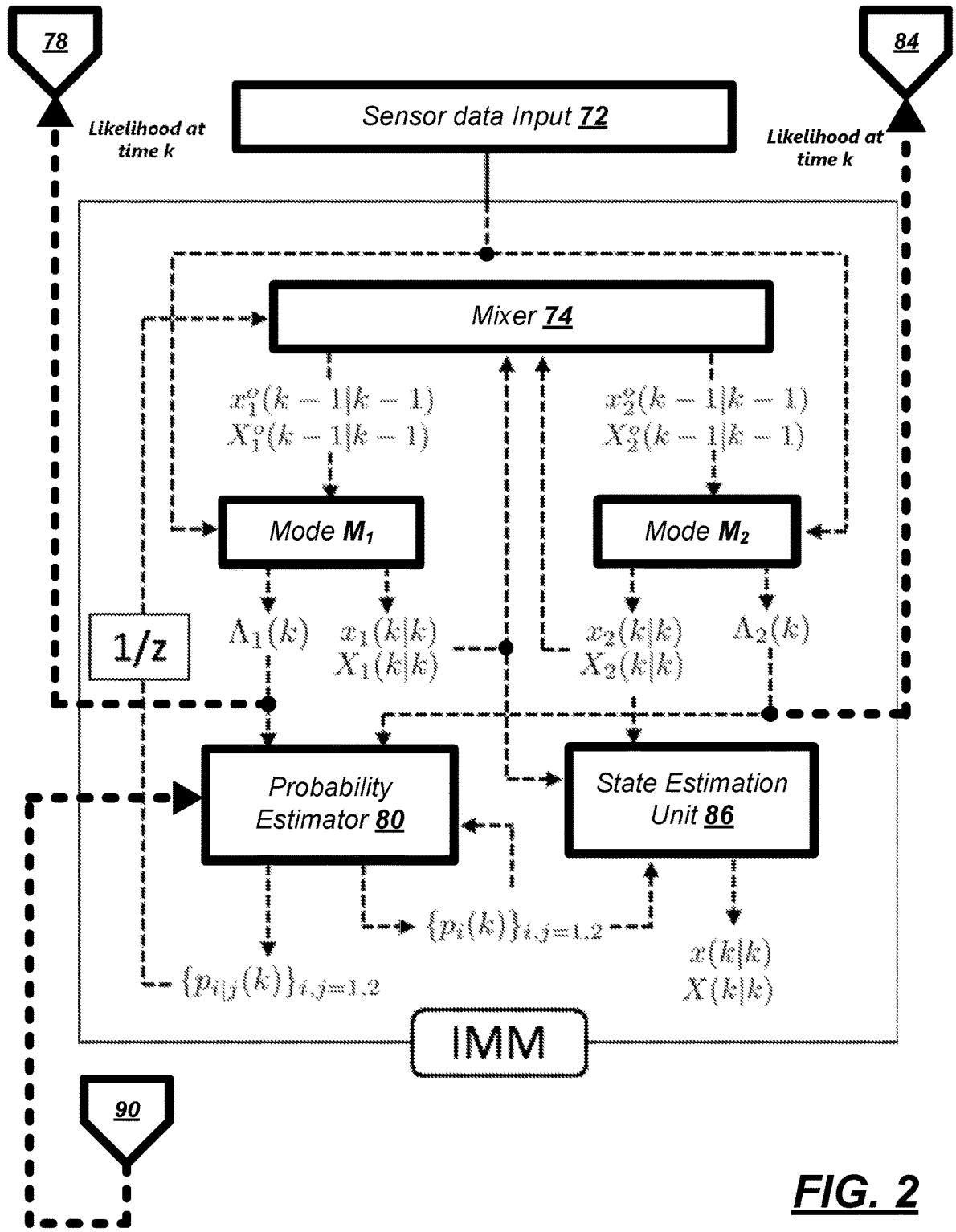
FIG. 2 is a flow diagram illustrating instructions of an interacting multiple model (IMM).

Generally, IMM instructions 50 comprise a state estimation that includes multiple modes (e.g., also called filters) that describe different dynamic models and fusing information from the multiple modes to yield the state estimation. FIG. 2 illustrates an example of IMM instructions 50. In this flow diagram, two modes M1, M2 are shown; however, it should be appreciated that more modes are possible (e.g., such as at least a third mode). Thus, according to one example, modes $M_1, M_2, M_3$ (see also FIG. 5) represent the LOW-AGG mode, the MED-AGG mode, and the HIGH-AGG mode, as discussed above. Parameters of each of the several modes may be based a large sampling of human driving behavior. In some instances, such parameters may be based on monitored driving patterns (e.g., collected using driving-data telematics devices plugged in vehicle OBD-II ports or the like).

The IMM instructions 50 may comprise receiving measured sensor data from vehicle sensors 16 (at an input 72). Computer 30 may feed the input 72 into a mixer 74 which mixes a likelihood of transition data ($\Lambda$) with previous likelihoods and updated sensor data (i.e., $\Lambda$ is a likelihood of transition between driving modes; shown in FIG. 2 as $\Lambda_1(k)$ and $\Lambda_2(k)$). The mixer 74 can provide output to mode $M_1$, mode $M_2$, and mode $M_3$ ($M_3$ is not shown), as well as any other modes not shown. Each of the driving modes $M_1$, $M_2$, $M_3$ may provide feedback to the mixer 74. And each of the modes $M_1$, $M_2$, $M_3$ may provide likelihood of transition data ($\Lambda$) to the TPE instructions 70 (e.g., see 78, 84, 79 and FIG. 4), described more below.

At least mode $M_1$ may provide feedback to mixer 74 and an output to a probability updater 80 which stores in memory (e.g., memory 44) a most-recent (a.k.a., previously-updated) transition probability matrix (referred to herein as $Q^0$).

Similarly, at least mode $M_2$ may provide feedback to the mixer 74 and an output to a state estimation unit 86 (which makes available as output from computer 30 whether the driver is operating in the LOW-AGG mode, the MED-AGG mode, or the HIGH-AGG mode). Probability updater 80 may provide output to the state estimation unit 86, as well as feedback to itself and the mixer 74 (e.g., via a Z-transform). While not shown in FIG. 2, mode $M_3$ may operate similarly to mode $M_1$, mode $M_2$, or a combination thereof.

In general, IMM instructions 50 are known in the art, e.g., as exemplified by "Transition Probability Estimation and its Application in Evaluation of Automated Driving," Sanghyun Hong, Jianbo Lu, Dimitar P. Filev, 2017 IEEE International Conference on Systems, Man, and Cybernetics (SMC), Banff Center, Banff, Canada, Oct. 5-8, 2017, the entirety of which is hereby incorporated by reference.

Figure 3:
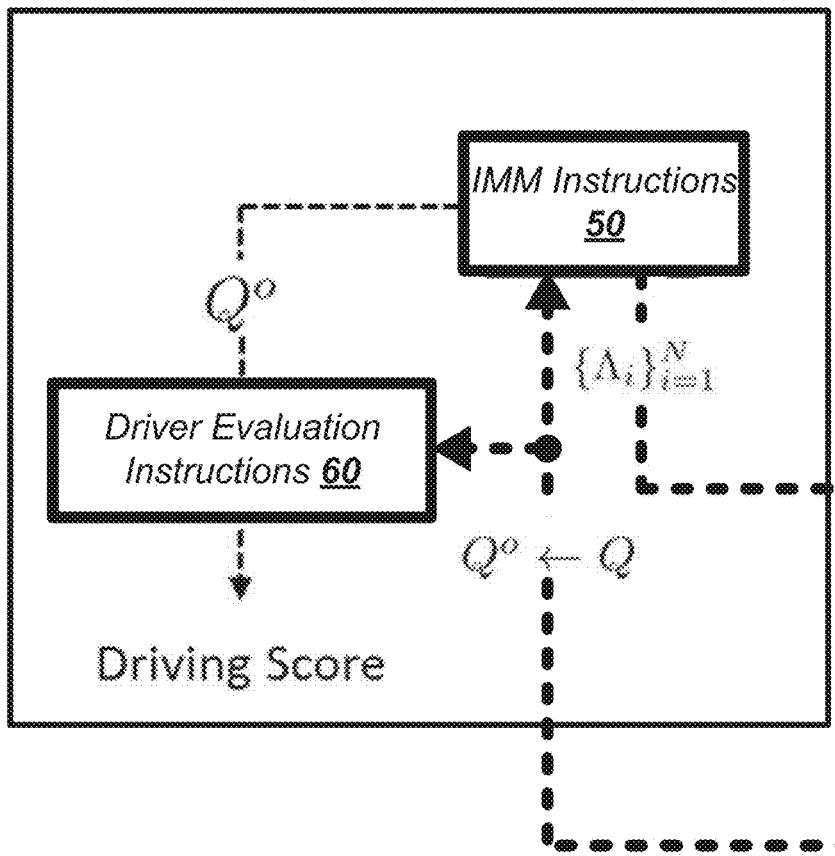
FIGS. 3-4 are flow diagrams illustrating use of likelihood of transition data ($\Lambda$) (e.g., likelihood of changes between a plurality of aggressive driving modes), an updated transition probability matrix (Q), and a previously-updated transition probability matrix ($Q^0$) between a set of driver evaluation instructions, a set of IMM instructions, and a set of transition probability estimation (TPE) instructions.
Figure 4:
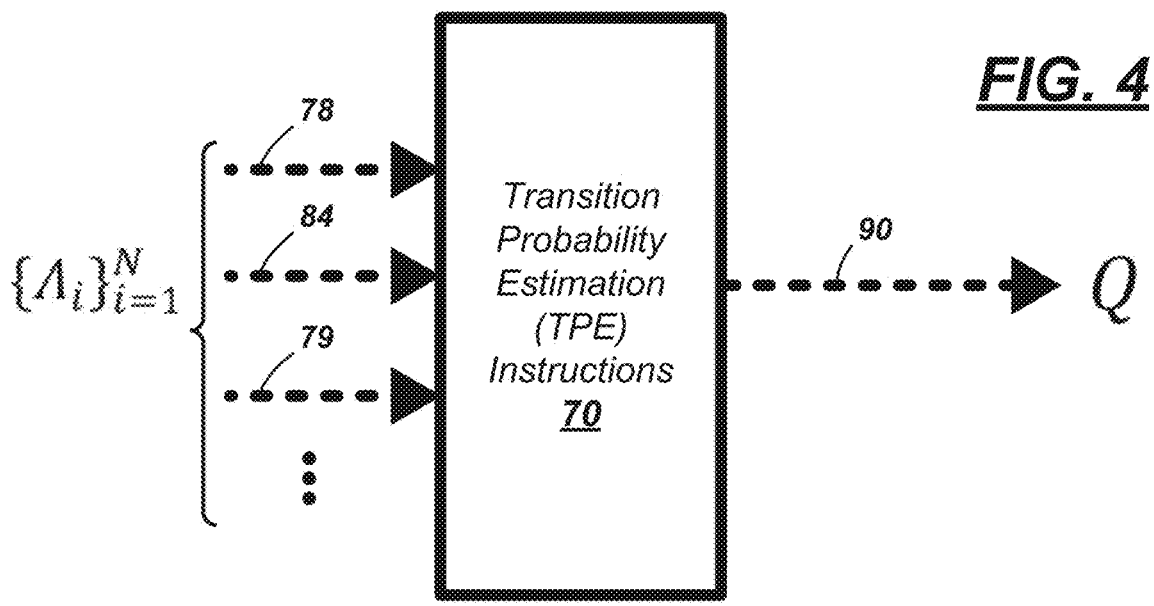

Turning to FIGS. 3-4, the TPE instructions 70 may receive likelihood of transition data ($\Lambda$) concurrently at a time (k) from the IMM instructions 50—e.g., concurrently from modes $M_1$, $M_2$, $M_3$. As used herein, likelihood of transition data ($\Lambda$) between driving modes (or simply likelihood data ($\Lambda$)) may be a probability that vehicle will, in the near future, change from one mode to another (e.g., from mode $M_1$ to mode $M_2$, from mode $M_1$ to mode $M_3$, from mode $M_2$ to mode $M_3$, from mode $M_2$ to mode $M_1$, from mode $M_3$ to mode $M_1$, or from mode $M_3$ to mode $M_2$, just to name a few examples. In at least one instance, such a transition may be determined to be imminent—i.e., occur immediately following a determination of likelihood of transition data ($\Lambda$)—e.g., within a few seconds.

Figure 5:
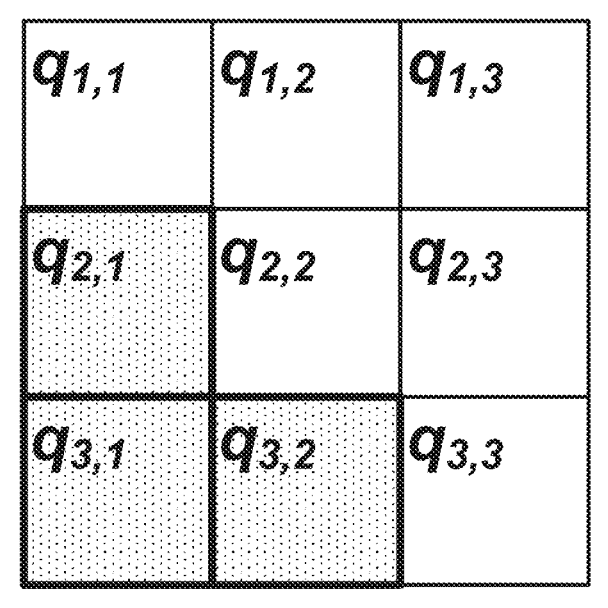

Using the likelihood of transition data ($\Lambda$) as input, the TPE instructions 70 may provide as an output 90 an updated transition probability matrix (referred to herein as Q). An example of Q is shown in FIG. 5 and is described more below.

Calculation of Q may be based on a theoretical scheme adapting an algorithm for recursive computation in real time, such as example Algorithm (1) (shown below). For example, the approach may define a joint probability $Pr(o_1, \ldots, o_t, s_t=M_i)$ as, a so-called, forward variable $\alpha_t(i)$, wherein $o_t$ represents an observation at a time t and $s_t$ represents a state of a Hidden Markov Model (HMM) at time t. In addition, at time t, the probability of an observation given state, $Pr(o_t|s_t=M_i)$, may be denoted as $b_i(o_t)$.

Using Algorithm (1) shown below, by Bayes' Theorem, the forward variable may be initialized with a first observation (Line 3), wherein $p_i$ is the mode probability fed from the IMM instructions 50. Then, at each step, Algorithm (1) may update the forward variable recursively (Line 6), where $q_{mi}$ is the transition probability from the $m^{th}$ mode to $i^{th}$ mode. Note that the forward variable $\alpha_t(i)$ may be reset on a regular basis with a pre-defined period $N_p$ (Line 2). As the definition suggests, observations $o_t$ continue to be collected, the forward variable becomes smaller and eventually results in the denormal number whose magnitude is smaller than computer 30 can store in memory 44. In order to avoid this numerical constraint, the forward variable may be reset periodically.

The joint conditional probability, $Pr(s_{t-1}=M_i, s_t=M_j|O_t)$, and this variable is updated with the forward variable, transition probability, and observation probability (Lines 11-12). Note that $O_t$ indicates the collection of observations from time 1 to t, i.e., $O_t=\{o_1, \ldots, o_t\}$. In addition, the conditional probability, $Pr(s_{t-1}=M_i|O_t)$, is defined as $\gamma_t(i)$, and, by Total Probability Theorem, this variable being updated by summing up $\zeta_t(i,j)$ over all the modes at time t (Lines 13-15).

Furthermore, Algorithm (1) defines $\bar{\gamma}_t(i)$ and $\bar{\zeta}(i,j)$, and these may be updated by adding $\gamma_t(i)$ and $\zeta_t(i,j)$ to those variables, respectively (Lines 16-17). Note that $\bar{\gamma}_t(i)$ and $\bar{\zeta}(i,j)$ represent the expected number of visiting $M_i$ and the expected number of transition from $M_i$ to $M_j$, respectively. Therefore, by dividing $\bar{\zeta}(i,j)$ with $\bar{\gamma}_t(i)$, the transition probability can be calculated given the observation up to time t, $Pr(s_t=M_j|s_{t-1}=M_i|O_t)$, and this estimates the transition probability $q_{ij}$ which is the element of Q (Lines 20-24).

Algorithm (1).
Suppose N modes,
1 Initialize $Q^0, \bar{\gamma}(i)=0, \bar{\zeta}((i,j))=0$, for $i,j=1, \ldots, N$
2 If $t=1$ or $N_p$,
3 $\alpha_t(i)=Pr(o_t, s_t=M_i)=p_i b_i(o_t)$,
4 for $i=1, \ldots, N$
5 Else
6 $\alpha_t(i)=Pr(o_1, \ldots, o_{t-1}, o_t, s_t=M_i)$,
7 $=\Sigma_{m=1}^N \alpha_{t-1}(m) q_{mi} b_i(o_t)$
8 for $i=1, \ldots, N$
9 End If
10 If t >1,
11 $\zeta_t((i,j))=Pr(s_{t-1}=M_i, s_t=M_j|O_t)$,
12 $=\alpha_{t-1}(i) q_{ij} b_j(o_t) / \Sigma_{i,j=1}^N \alpha_{t-1}(i) q_{ij} b_j(o_t)$
13 $\gamma_t(i)=Pr(s_{t-1}=M_i|O_t)$
14 $=\Sigma_{j=1}^N Pr(s_{t-1}=M_i, s_t=M_j|O_t)$
15 $=\Sigma_{j=1}^N \zeta_t(i,j)$
16 $\bar{\gamma}(i)=\bar{\gamma}(i)+\gamma_t(i)$,
17 $\bar{\zeta}(i,j)=\bar{\zeta}(i,j)+\zeta_t(i,j)$,
18 for $i,j=1, \ldots, N$.
19 End If
20 If $t=1$,
21 Q [i][j]=$Q_0$[i][j], for $i,j=1, \ldots, N$.
22 Else,
23 Q[i][j]=$\bar{\zeta}(i,j)/\bar{\gamma}(i)$, for $i,j=1, \ldots, N$
24 End If Thus, according to at least one example, three likelihoods of transition data ($\Lambda$) are received at the TPE instructions 70 from the modes $M_1$, $M_2$, $M_3$, and based on these three likelihoods of transition data ($\Lambda$), TPE instructions 70 calculates an updated Q. Of course, in other examples, the estimation of Q may be based on any suitable quantity (N) of likelihoods of transition data ($\Lambda$). Furthermore, determining Q is known in the art—e.g., see "Transition Probability Estimation and its Application in Evaluation of Automated Driving," pp. 3-4, Sanghyun Hong, Jianbo Lu, Dimitar P. Filev, 2017 IEEE International Conference on Systems, Man, and Cybernetics (SMC), Banff Center, Banff, Canada, Oct. 5-8, 2017, the entirety of which was previously incorporated by reference.

FIG. 5 illustrates a sample transition probability matrix (Q) determined by the TPE instructions 70. Here, N equals 3, and thus, the Q is a 3×3 matrix, wherein index i represents a row identifier, wherein index j represents a column identifier. Conceptually, $q_1$ represents LOW-AGG mode, $q_2$ represents MED-AGG mode, and $q_3$ represents HIGH-AGG mode. Thus, a transitioning between modes (e.g., from an $i^{th}$ mode to a $j^{th}$ mode) can be illustrates as $q_{ij}$. For example, $q_{13}$ thus represents transitioning from LOW-AGG mode to HIGH-AGG mode. And $q_{23}$ represents transitioning from MED-AGG mode to HIGH-AGG mode. Similarly, any of $q_{21}$, $q_{31}$, and $q_{32}$ represent transitioning from a higher aggressiveness mode to a lesser aggressiveness driving mode. Conversely, any of $q_{12}$, $q_{13}$, and $q_{23}$ represent transitioning from a lesser aggressiveness mode to a higher aggressiveness driving mode. Accordingly, any of $q_{11}$, $q_{22}$, and $q_{33}$ represent not transitioning between driving modes (e.g., but rather maintaining the current mode).

Having determined the Q, FIGS. 3-4 show that the Q may be provided to driver evaluation instructions 60 and also may be returned as feedback to the IMM instructions 50. In the IMM instructions 50, the previously-updated transition probability matrix Q° may be replaced with the updated transition probability matrix Q (e.g., Q°←Q). Similarly, the driver evaluation instructions 60 may use Q as well. In this manner, the IMM instructions 50 may repeatedly use updated information when determining state estimation. And by using the updated transition probability matrix Q, the driver evaluation instructions 60 provide more accurate and an up-to-date driving score (DS) and/or driving responsiveness (DR) values. Examples of how the driver evaluation instructions 60 may determine the driving score (DS) and/or driving responsiveness (DR) values are set forth below.

As will be explained more below, when the driver evaluation instructions 60 receives the Q, computer 30 may calculate a driving score (DS) and/or driving responsiveness (DR) values and report this to the driver and/or use this internally within vehicle computing systems (e.g., at computer(s) 14). Examples of these calculations are provided in process 600 which follows.

Figure 6:
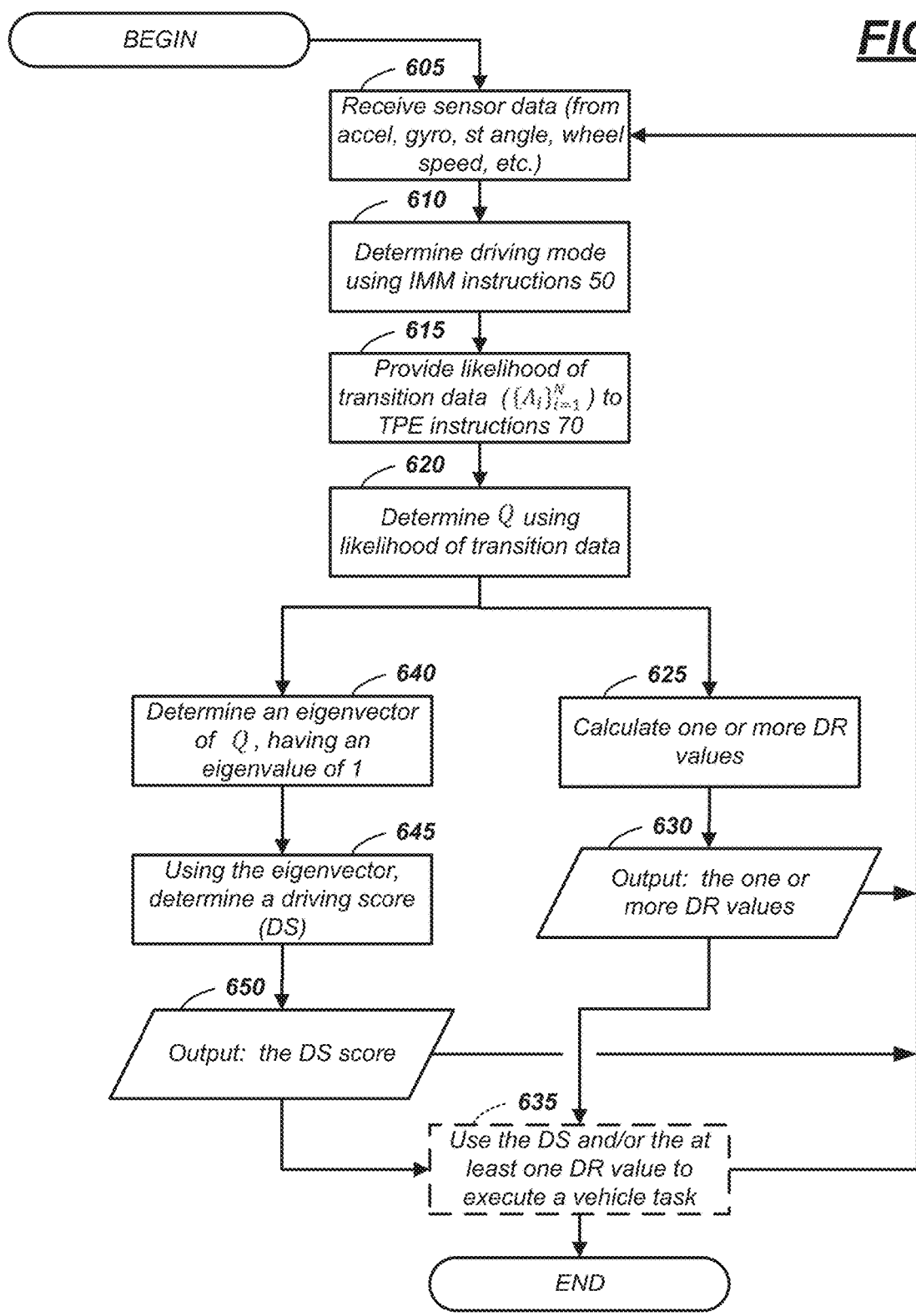
FIG. 6 is a flow diagram illustrating a process for determining a driving score (DS) and/or a driving responsiveness (DR) value based on the transition probability matrix (Q).

Turning now to FIG. 6, a flow diagram is shown illustrating a process 600 for determining a driving score (DS) and/or at least one driving responsiveness (DR) value. The process may begin with block 605, wherein computer 30 receives sensor data from the vehicle sensors 16. In at least one example, the computer 30 receives sensor data from the accelerometer(s) 18, the gyroscope(s) 20, the wheel sensor(s) 22, and the steering angle sensor 24. In other examples, the computer 30 receives sensor data from one or more of these and/or other vehicle sensors. As discussed above, computer 30 may use the sensor data at the input 72 of the IMM instructions 50.

In block 610 which follows, based on the sensor data, computer 30 may determine a probability of being in a particular driving mode using the output of the IMM instructions 50. For example, in accordance with instructions 50, computer 50 may perform mixing in mixer 74, determine a likelihood at a time k of being in a particular mode (e.g., $M_1$, $M_2$, $M_3$), utilize a previously-updated Q° to estimate a state probability (in probability estimator 80), and ultimately statistically identify a driving mode via the state estimation unit 86 (e.g., one of the LOW-AGG mode, the MED-AGG mode, or HIGH-AGG mode). It should be appreciated that the IMM instructions 50 may be repeatedly executed while the remainder of process 600 is carried out.

In block 615, while computer 30 carries out the IMM instructions 50, the modes $M_1$, $M_2$, $M_3$ may generate likelihood of transition data (Λ), and computer 30 may provide this data as input to the transition probability estimation (TPE) instructions 70. Thus, according to at least one example, three likelihoods of transition data (Λ) (78, 84, 79) may be provided to TPE instructions 70—e.g., one likelihood of transition data (Λ) for each driving mode $M_1$, $M_2$, $M_3$.

In block 620, computer 30—via the TPE instructions 70—may use the likelihood of transition data (Λ) for the driving modes to determine an updated transition probability matrix Q. According to one example, this is carried out using Algorithm (1), described in detail above.

Following block 620, computer 30 may execute block 625, 640, or both—e.g., at least partially concurrently or sequentially. Each will be discussed in turn.

In block 625, computer 30 may determine one or more driving responsiveness (DR) values. For instance, any single one of Equations (1), (2), (3), and (4) [shown below]—as well as combinations thereof—may be executed by computer 30. In at least one example, computer 30 executes each of Equations (1), (2), (3), and (4) for each iteration of block 625.

Equation (1)—a DR value representing a probability of transitioning from a higher aggressiveness mode to a lesser aggressiveness driving mode:

$$\text{DR value } (1) = w_{21}q_{21} + w_{31}q_{31} + w_{32}q_{32},$$

wherein $w_{21}$, $w_{31}$, and $w_{32}$ are predefined weighting values, wherein $q_{21}$, $q_{31}$, and $q_{32}$ are index values of Q (e.g., a weighted sum of Q for all indices that satisfy i>j).

Equation (2)—a DR value representing a probability of transitioning from a lesser aggressiveness mode to a higher aggressiveness driving mode:

$$\text{DR value } (2) = w_{11}q_{11} + w_{12}q_{12} + w_{13}q_{13},$$

wherein $w_{11}$, $w_{12}$, and $w_{13}$ are predefined weighting values, wherein $q_{11}$, $q_{12}$, and $q_{13}$ are index values of Q (e.g., a weighted sum of a first row of Q).

Equation (3)—a DR value representing a probability of transitioning from a higher aggressiveness mode to a lesser aggressiveness driving mode:

$$\text{DR value } (3) = w_{31}q_{31} + w_{32}q_{32} + w_{33}q_{33},$$

wherein $w_{31}$, $w_{32}$, and $w_{33}$ are predefined weighting values, wherein $q_{31}$, $q_{32}$, and $q_{33}$ are index values of Q (e.g., a weighted sum of a third row of Q).

Equation (4)—a DR value representing a probability of maintaining a medium aggressiveness mode (e.g., not transitioning between driving modes):

$$\text{DR value } (4) = w_{21}q_{21} + w_{22}q_{22} + w_{23}q_{23},$$

wherein $w_{21}$, $w_{22}$, and $w_{23}$ are predefined weighting values, wherein $q_{21}$, $q_{22}$, and $q_{23}$ are index values of Q (e.g., a weighted sum of a second row of Q).

As discussed above, the DR values (1), (2), (3), and (4) are associated with a 3×3 Q (e.g., three driving modes). Thus, similar equations can be derived for a 4×4 Q, a 5×5 Q, etc. Further, the DR values similarly may comprise: a weighted sum of Q for all indices that satisfy i>j; a weighted sum of index values of a first row of Q; a weighted sum of index values of a third row of Q; a weighted sum of index values of a second row of Q; a weighted sum of index values of a fourth row of Q; etc.

Following block 625, computer 30 may output one or more of the DR values (block 630). Providing the DR values as output may comprise using the DR values in another set of instructions executed by computer 30, sending the DR value(s) to computer 14, displaying a driving aggressiveness transition on a vehicle display or the like. Following block 630, process 600 may proceed to block 635 (optional) or may loop back to block 605 and begin again.

In block 635, computer 30, computer 14, or the like executes a vehicle task using the DR value, the driving score (DS), or both. For example, the vehicle task may include using the DR values to determine a worn vehicle tire, an unpressured vehicle tire, a vehicle wheel misalignment, or the like. For example, where computer 14 executes an autonomous driving control loop—e.g., maintain vehicle lane position—computer 14 may receive DR values that indicate that vehicle 12 is in a MED-AGG mode or HIGH-AGG mode while computer 14 repeatedly attempts to maintain vehicle 12 in a LOW-AGG mode. This tendency to transition to a MED-AGG or HIGH-AGG mode may be an indication that the vehicle needs maintenance. Of course, this feedback of a vehicle control loop (and lane-keeping navigation) are merely a couple of examples of how DR values may be used. Other examples also exist.

Returning to block 640 of process 600, computer 30 may calculate an eigenvector (p*) of Q having an eigenvalue of '1.' In this manner, a driving score (DS) may be determined in an invariant mode. As used herein, a driving score in an invariant mode means that the driving score remains unchanged when a mathematical transformation is applied. Accordingly, eigenvector (p*) satisfies Equation (5).

$$p^*Q=p^*.$$ Equation (5).

Equation (6) represents an eigenvector that may be determined by computer 30.

$$p^*=[p_1^*, \ldots, p_N^*],$$ Equation (6).

wherein N is the size of the transition probability matrix Q (e.g., in the example above, N=3, as a 3×3 Q was illustrated).

Following determination of the eigenvector (p*), in block 645, computer 30 may determine a driving score (DS) using the eigenvector of Equation (6). This may include evaluating Equation (7). Equation (7) is adapted to the previously-described 3×3 Q. Thus, while Equation (7) has three weighted terms, if the Q was 4×4, then Equation (7) would have four terms, etc.

$$DS=v_1p_1^*+v_2p_2^*+v_3p_3^*,$$ Equation (7).

wherein $v_1$, $v_2$, and $v_3$ are predefined weighting values associated with the LOW-AGG mode, the MED-AGG mode, and the HIGH-AGG mode, respectively.

Block 650 which may follow block 645 may be similar or identical to block 630, except that computer 30 may output the driving score (DS). Therefore, it will not be re-described here.

Following block 650, process 600 may loop back to block 605 and repeat process 600, or proceed to block 635, as previously described.

Figure 7:
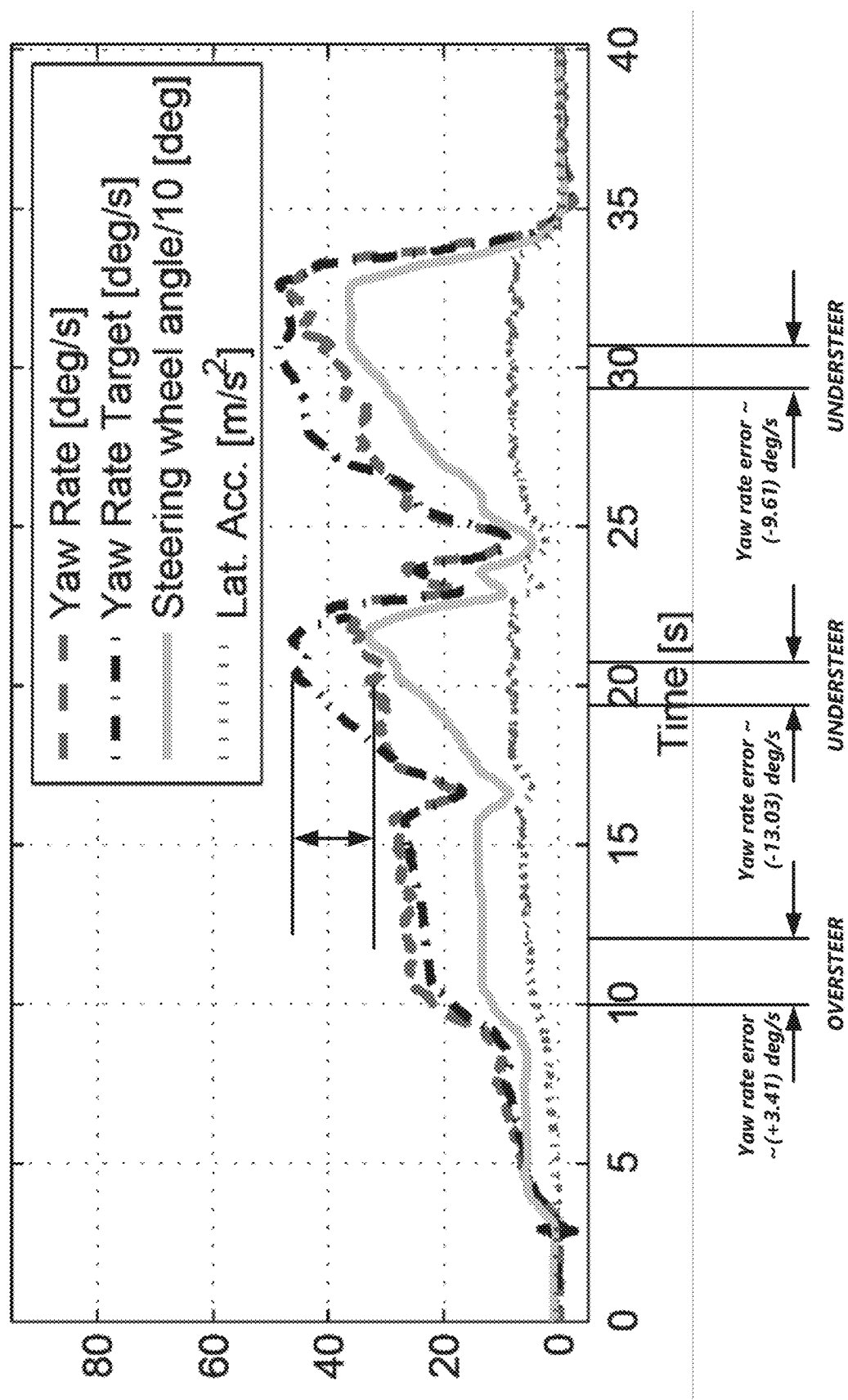
FIGS. 7-12 are experimental data illustrating relationships between driving aggressiveness and driving score (DS) and a driving responsiveness (DR) value.

Turning now to FIGS. 7-12, experimental results are provided that illustrate the disclosure above. For example, FIG. 7 illustrates the IMM instructions 50 implemented for the yaw error vehicle dynamics to evaluate driving behavior on curved roads. More particularly, in this example, a professional driver drove a test vehicle to imitate aggressive driving by humans or virtual drivers of autonomous vehicles. In the test drive, the professional driver maneuvered harsh steering on a snowy road in order to approach handling limit conditions (e.g., just prior to skidding). As shown in FIG. 7, lateral acceleration is measured up to 8.132 m/s² at about 20 seconds. In addition, a measured yaw rate created errors from a target yaw rate provided by the vehicle's electronic stability control system.

In FIG. 7, the yaw rate errors, i.e. subtraction of the target yaw rate from the measured yaw rate, approximate 3.41 for 10~12 seconds, approximate −13.03 for 19~21 seconds, and approximate −9.62 for 29~31 seconds, respectively. This implies that the test vehicle underwent some oversteer first and then understeer twice. Therefore, it can be expected a high probability of staying at the third mode (representing aggressive driving, $q_{33}$) and an increase in the probabilities of transitions from the first mode (representing a less aggressive driving mode) to the second or third modes, i.e., $q_{12}$ or $q_{13}$, respectively.

Figure 8:
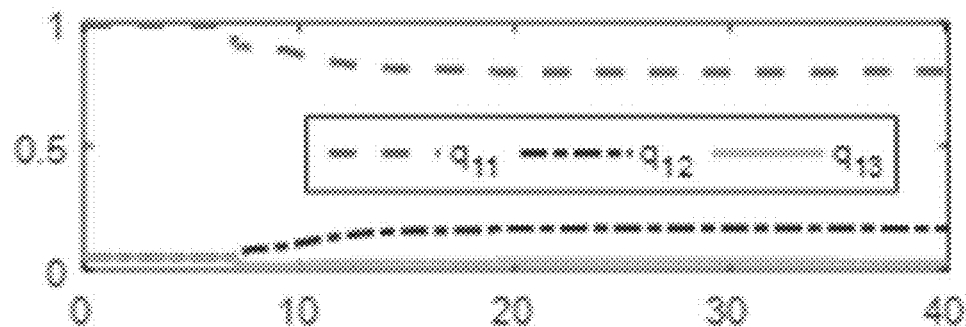
Figure 9:
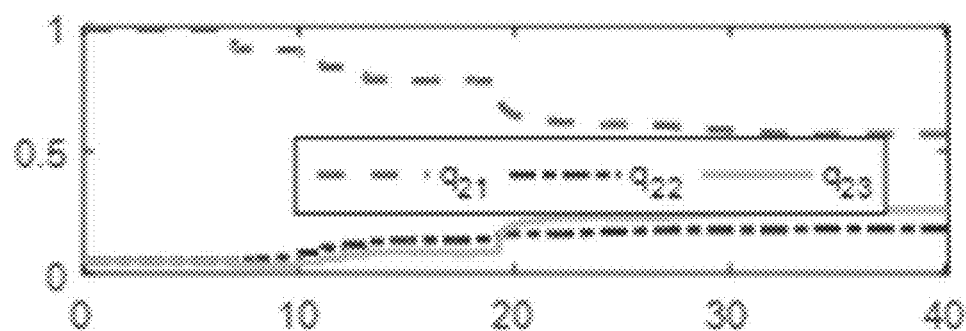
Figure 10:
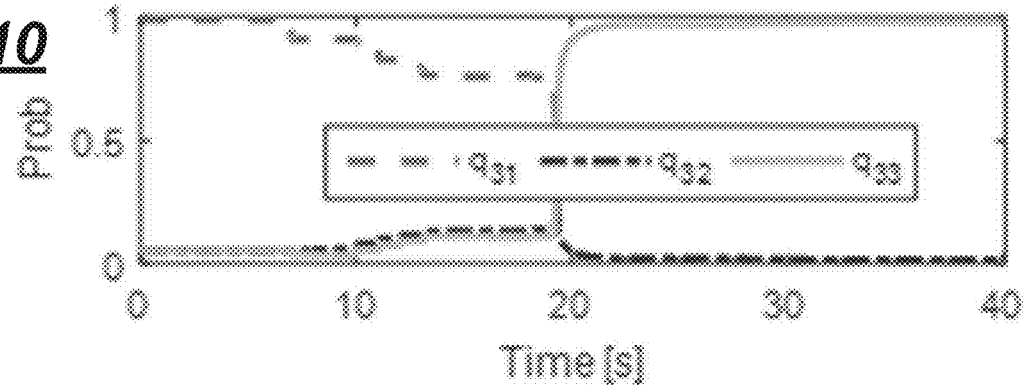

FIGS. 8-10 illustrates transition probability estimation results. As can be seen, the probability $q_{12}$ increases as a driver starts harsh steering at around 7 s, and $q_{33}$ maintains a value near 1 after multiple harsh steering has been generated.

Figure 11:
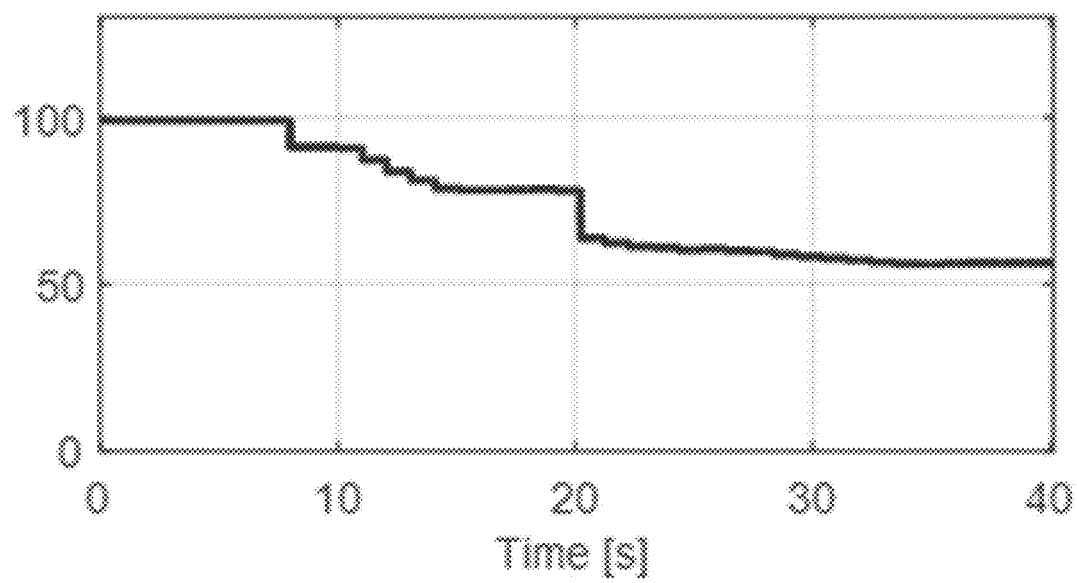
Figure 12:
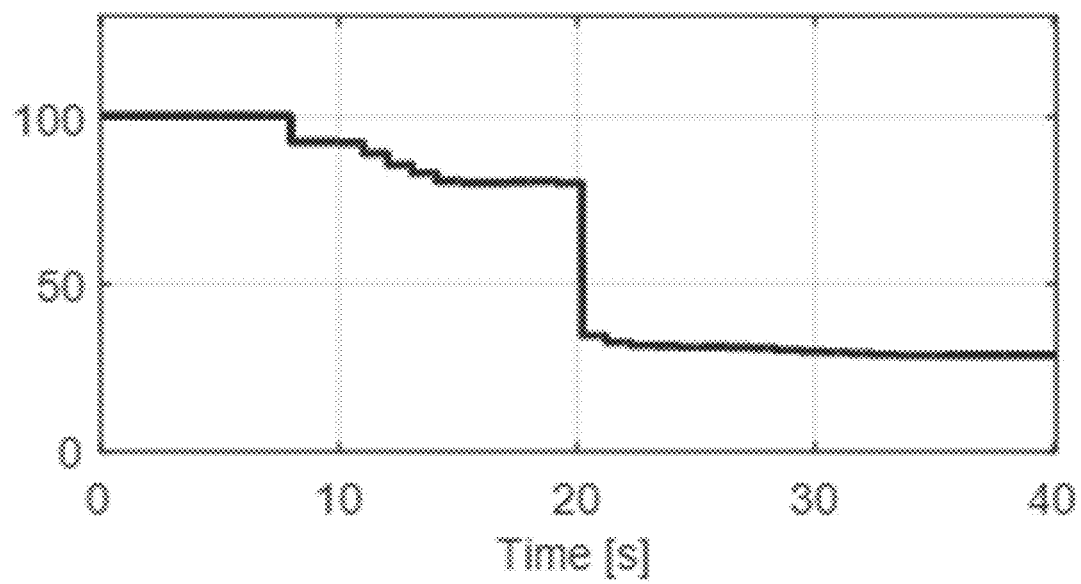

FIG. 11 illustrates a calculate driving score calculated using Equation (7). As the vehicle continues to undergo harsh steering, the driving score decreases and stay near 50. Furthermore, FIG. 12 (which corresponds to FIG. 11) illustrates a driving responsiveness (DR) value. Since the driver generated continuous harsh steering maneuvers, the driving responsiveness (DR) value decreases and drops below 50 after around 20 seconds.

Thus, there has been described a predictive driving behavior system for a vehicle. The system may include a computer and multiple sensors that measure data indicative of driving behavior. The computer may determine a driving responsiveness score and/or a driving score using a set of instructions for interacting multiple model (IMM) and a set of instructions for transition probability estimation.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method, comprising:
    determining a driving responsiveness (DR) value using a weighted sum comprising indices of a transition probability matrix (Q), the Q being derived from likelihood of transition data ($\Lambda$) between a plurality of driving modes from a set of interacting multiple model (IMM) instructions, wherein a driving mode is a classification of driving aggressiveness, wherein likelihood of transition data ($\Lambda$) between driving modes is a probability that a vehicle will, in the near future, change from one of the plurality of driving modes to another of the plurality of driving modes.

2. The method of claim 1, wherein the Q is based on a set of transition probability estimation instructions that include a Hidden Markov Model algorithm.

3. The method of claim 1, wherein the plurality of driving modes comprises a low-aggressiveness mode, a medium-aggressiveness mode, and a high-aggressiveness mode.

4. The method of claim 1, wherein the DR value represents a probability of transitioning from a higher aggressiveness mode to a lesser aggressiveness driving mode.

5. The method of claim 4, wherein the DR value equals $w_{21}q_{21}+w_{31}q_{31}+w_{32}q_{32}$, wherein $w_{21}$, $w_{31}$, and $w_{32}$ are predefined weighting values, wherein $q_{21}$, $q_{31}$, and $q_{32}$ are index values of the Q (according to $q_{ij}$) for indices that satisfy i>j.

6. The method of claim 4, wherein the DR value equals $w_{31}q_{31}+w_{32}q_{32}+w_{33}q_{33}$, wherein $w_{31}$, $w_{32}$, and $w_{33}$ are predefined weighting values, wherein $q_{31}$, $q_{32}$, and $q_{33}$ are index values of the Q.

7. The method of claim 1, wherein the DR value represents a probability of transitioning from a lesser aggressiveness mode to a higher aggressiveness driving mode.

8. The method of claim 7, wherein the DR value equals $w_{11}q_{11}+w_{12}q_{12}+w_{13}q_{13}$, wherein $w_{11}$, $w_{12}$, and $w_{13}$ are predefined weighting values, wherein $q_{11}$, $q_{12}$, and $q_{13}$ are index values of the Q.

9. The method of claim 1, wherein the DR value represents a probability of maintaining a medium aggressiveness mode.

10. The method of claim 9, wherein the DR value equals $w_{21}q_{21}+w_{22}q_{22}+w_{23}q_{23}$, wherein $w_{21}$, $w_{22}$, and $w_{23}$ are predefined weighting values, wherein $q_{21}$, $q_{22}$, and $q_{23}$ are index values of the Q.

11. The method of claim 1, further comprising: determining a corresponding driving score (DS) using the Q.

12. The method of claim 11, further comprising: determining an eigenvector (p*) of Q having an eigenvalue of 1.

13. The method of claim 12, wherein $DS=v_1 p_1^* + v_2 p_2^* + v_3 p_3^*$, wherein $v_1$, $v_2$, and $v_3$ are predefined weighting values associated with a low-aggressiveness mode, a medium-aggressiveness mode, and a high-aggressiveness mode, respectively.

14. A system, comprising:
a plurality of vehicle sensors; and
a computer, comprising a processor and memory storing instructions executable by the processor, the instructions comprising, to:
derive likelihood of transition data ($\Lambda$) between a plurality of driving modes from sensor data from the plurality of sensors; and
using the likelihood of transition data ($\Lambda$), determine a driving responsiveness (DR) value using a weighted sum comprising indices of a transition probability matrix (Q),
wherein a driving mode is a classification of driving aggressiveness, wherein likelihood of transition data ($\Lambda$) between driving modes is a probability that a vehicle will, in the near future, change from one of the plurality of driving modes to another of the plurality of driving modes.

15. The system of claim 14, the instructions, further comprising, to: execute a set of driver evaluation instructions, a set of IMM instructions, and a set of transition probability estimation (TPE) instructions.

16. The system of claim 14, wherein the DR value represents a probability of transitioning from a higher aggressiveness mode to a lesser aggressiveness driving mode.

17. The system of claim 16, wherein the DR value equals one of: $w_{21}q_{21}+w_{31}q_{31}+w_{32}q_{32}$, wherein $w_{21}$, $w_{31}$, and $w_{32}$ are predefined weighting values, wherein $q_{21},q_{31}$, and $q_{32}$ are index values of the Q (according to $q_{ij}$) for indices that satisfy i>j; or $w_{31}q_{31}+w_{32}q_{32}+w_{33}q_{33}$, wherein $w_{31}$, $w_{32}$, and $w_{33}$ are predefined weighting values, wherein $q_{31},q_{32}$, and $q_{33}$ are index values of the Q.

18. The system of claim 14, wherein the DR value represents a probability of transitioning from a lesser aggressiveness mode to a higher aggressiveness driving mode, wherein the DR value equals $w_{11}q_{11}+w_{12}q_{12}+w_{13}q_{13}$, wherein $w_{11}$, $w_{12}$, and $w_{13}$ are predefined weighting values, wherein $q_{11}$, $q_{12}$, and $q_{13}$ are index values of the Q.

19. The system of claim 14, wherein the DR value represents a probability of maintaining a medium aggressiveness mode, wherein the DR value equals $w_{21}q_{21}+w_{22}q_{22}+w_{23}q_{23}$, wherein $w_{21}$, $w_{22}$, and $w_{23}$ are predefined weighting values, wherein $q_{21}$, $q_{22}$, and $q_{23}$ are index values of the Q.

20. The system of claim 14, the instructions further comprising, to: determine a corresponding driving score (DS) using the Q; and determine an eigenvector (p*) of Q having an eigenvalue of 1, wherein $DS=v_1p_1^*+v_2p_2^*+v_3p_3^*$, wherein $v_1$, $v_2$, and $v_3$ are predefined weighting values associated with a low-aggressiveness mode, a medium-aggressiveness mode, and a high-aggressiveness mode, respectively.

* * * * *

UNITED STATES PATENT AND TRADEMARK OFFICE
CERTIFICATE OF CORRECTION

PATENT NO. : 10,513,270 B2  
APPLICATION NO. : 15/971375  
DATED : December 24, 2019  
INVENTOR(S) : Sanghyun Hong et al.

Page 1 of 1

It is certified that error appears in the above-identified patent and that said Letters Patent is hereby corrected as shown below:

In the Claims

Column 14, in Line 66, replace "wherein DS=V11P1*+V2P2*+" with – wherein DS=V1P1*+V2P2*+ –.

Signed and Sealed this  
Seventeenth Day of November, 2020

Andrei Iancu  
*Director of the United States Patent and Trademark Office*